United States Patent [19]

Wedellsborg

[11] Patent Number: 4,767,593
[45] Date of Patent: Aug. 30, 1988

[54] MULTIPLE SHELL PRESSURE VESSEL

[76] Inventor: Bendt W. Wedellsborg, 552 Maureen La., Pleasant Hill, Calif. 94523

[21] Appl. No.: 62,788

[22] Filed: Jun. 15, 1987

[51] Int. Cl.$^4$ ............................................. G21C 13/04
[52] U.S. Cl. ..................................... 376/294; 220/426;
376/250; 376/285; 376/286; 376/292
[58] Field of Search ........................... 220/3, 5A, 426;
376/250, 285, 286, 291, 292, 293, 294, 328

[56] References Cited

U.S. PATENT DOCUMENTS

| | | |
|---|---|---|
| 339,885 | 4/1886 | Hill . |
| 1,925,118 | 9/1933 | Stresau . |
| 2,204,156 | 6/1940 | Semon . |
| 2,629,354 | 5/1949 | Gay . |
| 2,768,200 | 10/1956 | Busby . |
| 2,796,529 | 6/1957 | Morrison . |
| 3,016,463 | 1/1962 | Needham . |
| 3,098,023 | 7/1963 | Schluderberg ....................... 376/294 |
| 3,155,595 | 11/1964 | Schluderberg ....................... 376/294 |
| 3,276,965 | 10/1966 | Leyse .................................... 376/293 |
| 3,282,459 | 11/1966 | Wilson .................................. 220/426 |
| 3,443,631 | 5/1969 | Bremer et al. . |
| 3,578,564 | 5/1971 | Fletcher, III ........................ 376/293 |
| 3,592,120 | 7/1971 | Goetz .................................... 220/426 |
| 3,647,103 | 3/1972 | Berman ................................ 220/426 |
| 3,683,574 | 8/1972 | Vaessen . |
| 3,711,371 | 1/1973 | Cahill, Jr. ............................ 376/293 |
| 3,830,290 | 8/1974 | Thamasett et al. ................. 376/250 |
| 4,011,132 | 3/1977 | Kimpf et al. . |
| 4,406,855 | 9/1983 | Schwiers et al. .................... 376/250 |
| 4,495,137 | 1/1985 | Otsubo ................................. 376/293 |
| 4,696,790 | 9/1987 | Elter et al. ........................... 376/250 |

FOREIGN PATENT DOCUMENTS

| | | | |
|---|---|---|---|
| 228433 | 10/1959 | Australia ............................. | 376/294 |
| 1242466 | 11/1959 | France . | |
| 0009958 | 5/1969 | Japan ................................... | 376/294 |
| 1079486 | 8/1967 | United Kingdom . | |

Primary Examiner—Deborah L. Kyle
Assistant Examiner—Richard W. Wendtland
Attorney, Agent, or Firm—Robert R. Tipton

[57] ABSTRACT

A multiple shell pressure vessel utilizes a number of spaced apart, concentrically disposed pressure vessel shells within and spaced apart from an outer pressure vessel shell, the spaces between each shell being filled with a low melting point, high boiling point material selected from the group, lead, tin, antimony, bismuth, or sodium and potassium, and mixtures thereof and subjected to a pressure whereby the innermost pressure vessel shell wall is maintained in compression while the main vessel is pressurized. Chemical compositions or compounds which contain boron or cadmium may also be added to the filler material. The vessel may include devices for keeping the pressure in the space between the innermost pressure vessel shell and the next innermost shell at a fixed predetermined multiple of the pressure within the innermost pressure vessel shell. A method of constructing the multiple shell pressure vessel includes a sequence of steps for filling the spaces between shells with the low melting point, high boiling point materials in such a way that the inner shell is compressed and the outer shells are in tension.

16 Claims, 6 Drawing Sheets

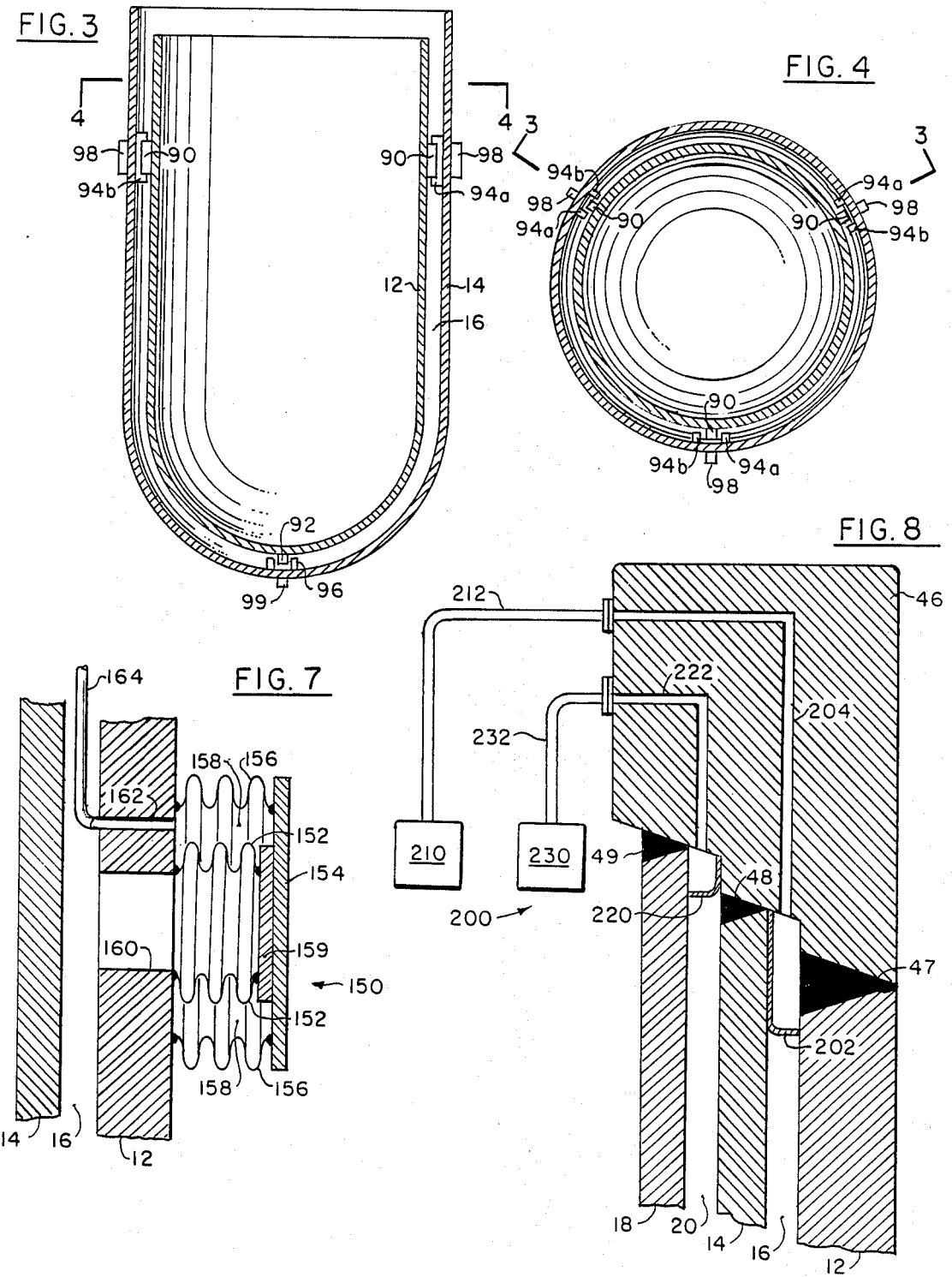

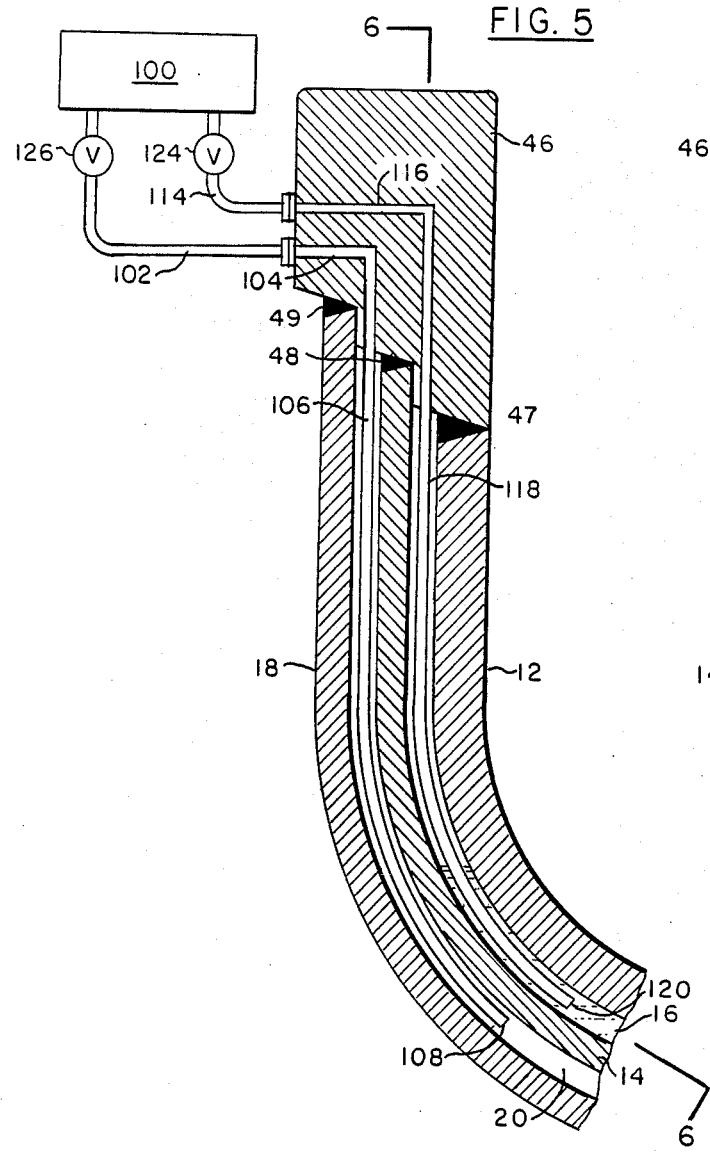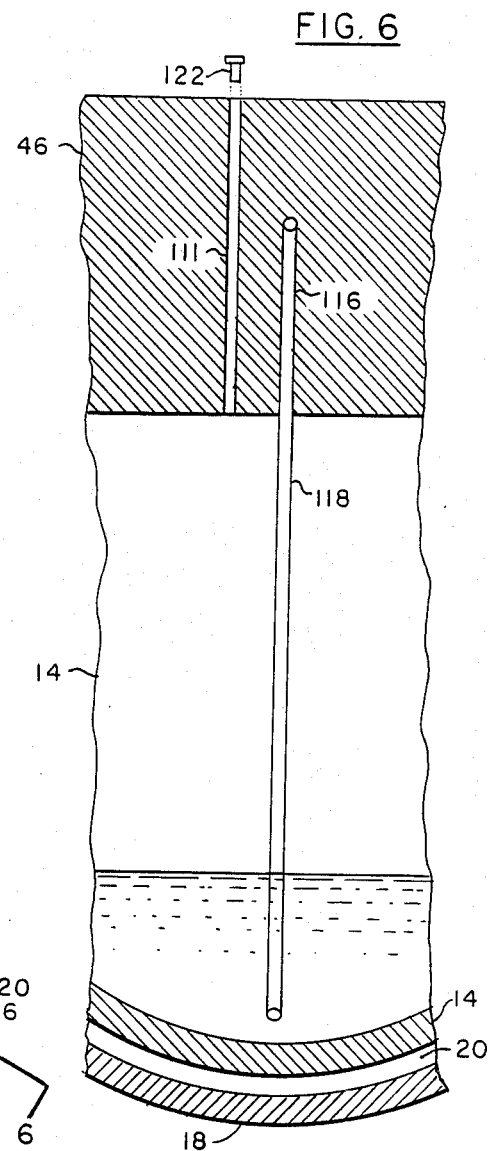

TEMPERATURE PROFILE

TEMPERATURE PROFILE

PRESSURE PROFILE

TEMPERATURE PROFILE

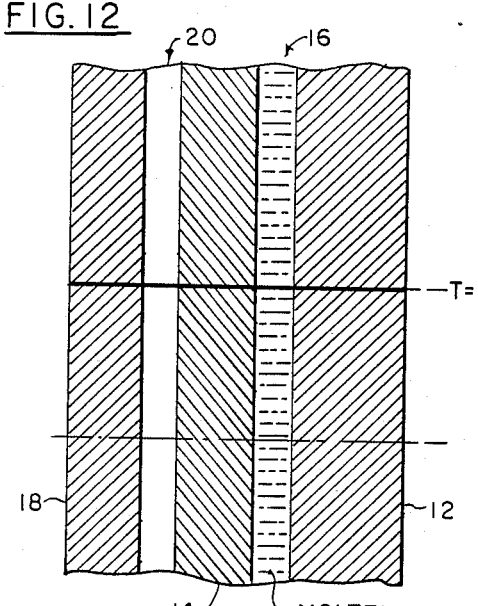
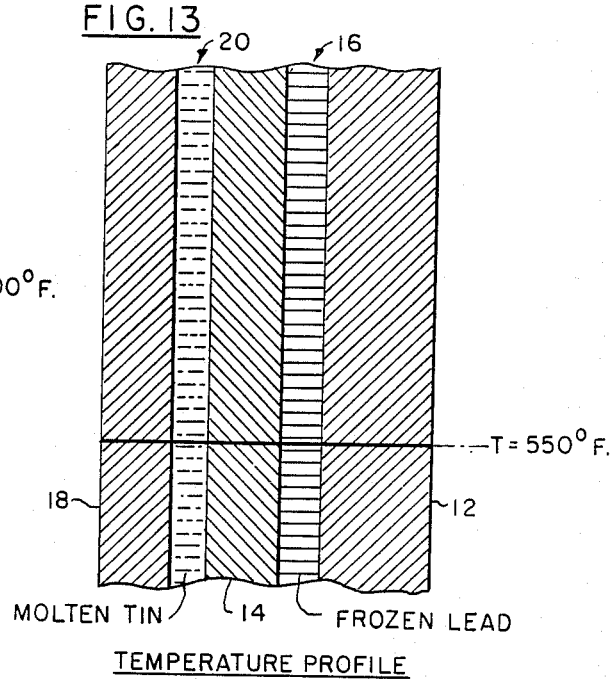
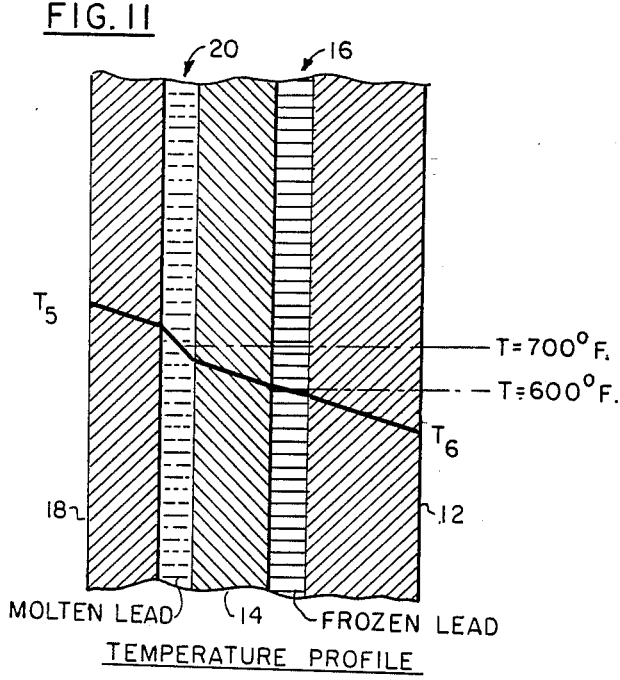

MULTIPLE SHELL PRESSURE VESSEL

BACKGROUND OF THE PRIOR ART

This invention relates generally to pressure vessels and in particular to pressure vessels for withstanding cyclic pressure and temperature extremes such as those found in nuclear reactor pressure vessels.

Pressure vessels used for containing a nuclear reactor must be designed for operating conditions involving a combination of high temperatures and high pressures along with strong radiation in the form of neutrons and gamma rays.

The pressure vessel must also be designed for emergency conditions such as Loss of Coolant Accidents (LOCA) and Pressurized Thermal Shock (PTS).

The LOCA conditions may cause the vessel pressure to drop suddenly while the temperature may remain the same or even increase The PTS condition, which may be caused by the injection of cold "coolant" into the pressure vessel from the emergency core cooling system (ECCS), may cause steep temperature gradients, such as, a sudden drop in temperature of the inside surface of the pressure vessel and a portion of the vessel wall, while the pressure may remain constant or even increase.

When pressure vessels are subjected to these pressure and temperature extremes, high tensile stresses are produced inside the vessel wall, particularly in the region of wall penetrations, such as, coolant inlet and outlet ports of the pressure vessel. During pressurized thermal shock (PTS) (as might be caused by a loss of coolant accident (LOCA)) where cold coolant is introduced to replace the lost coolant, steep thermal gradients in the vessel wall may cause large tensile stresses to occur in the crotch region of the vessel-outlet and vessel-inlet port intersections which may result in cracking of the vessel wall.

In addition, crack initiation may be aided due to embrittlement of the vessel wall by the high level of neutron and gamma radiation being absorbed.

To alleviate this condition, some multiple layer pressure vessels of the prior art utilized concentrically disposed multiple shell pressure vessels shrunk fit onto each other.

Other pressure vessels utilized multiple layers of sheet metal spirally wrapped around the outside of an inner pressure vessel.

In some of the pressure vessels using spaced apart shells, the space between the shell was filled with a neutron absorbing material.

One prior art device utilized spaced apart pressure vessel shells filled with coolant or a low melting point material to effect a uniform pressure distribution. The filler material was not maintained under pressure.

SUMMARY OF THE INVENTION

The multiple shell pressure vessel of the present invention utilizes a set of concentrically disposed, spaced apart pressure vessel shells surrounding an inner pressure vessel, the spaces between the pressure vessel shells being filled with a low melting point, high boiling point material, selected from the group consisting of lead, tin, antimony, bismuth, or sodium and potassium, and mixtures thereof, pressurized to a pressure whereby the wall of the innermost pressure vessel shell is in compression or very low tension during steady state operation. Chemical compositions or compounds containing boron or cadmium may also be added to the molten filler material.

The pressure vessel of the present invention may also include devices for maintaining the pressure in the space between the innermost pressure vessel shell and the next inner pressure vessel shell at a constant predetermined multiple of the pressure in the innermost pressure vessel The present invention also includes a configuration of concentric conduit pressure vessel penetration that reduces tensile stresses resulting from transient thermal and pressure variations.

The present invention also includes a method of fabricating the multiple shell pressure vessel utilizing concentric, spaced apart pressure vessel shells and the subsequent (or simultaneous) introduction of molten filler materials and the pressurization thereof.

It is, therefore, an object of the present invention to provide a pressure vessel offering greater safety with respect to initiation and propagation of cracking due to pressurized thermal shock (PTS)

It is a further object of the present invention to provide a multiple shell pressure vessel in which the wall of the innermost pressure vessel shell is maintained in compression during steady state operation of the pressure vessel It is still another object of the present invention to provide a multiple shell pressure vessel in which the wall of the innermost pressure vessel is always maintained in compression or in low tension below the yield point of the wall material of the innermost pressure vessel during a temperature or pressure transient within the innermost pressure vessel shell It is yet a further object of the present invention to provide a multiple shell pressure vessel in which the spaces between the pressure vessel shells are filled with a low melting point, high boiling point material that is pressurized to a point whereby the wall of the innermost pressure vessel is maintained in compression during normal operation.

It is also another object of the present invention to provide a device whereby the compression in the wall of the innermost pressure vessel shell is maintained relatively constant for variations in pressure within the innermost pressure vessel.

It is yet another object of the present invention to provide a method of fabricating a multiple shell pressure vessel with pre-stressed (or pre-pressurized) fillers.

These and other objects of the present invention will become manifest upon study of the following specification when taken together with the drawings.

BRIEF DESCRIPTION OF THE DRAWINGS

FIG. 3 is a sectional, elevational view of a two shell pressure vessel and the manner in which the shells are assembled.

FIG. 4 is a cross section of the two shell pressure vessel configuration of FIG. 3 taken at line 4—4.

FIG. 5 is an elevational cross section of the pressure vessel of the present invention illustrating one method of filling the interstices with a low melting point, high boiling point material.

FIG. 6 is a partial cut-away of FIG. 5 taken at line 6—6.

FIG. 7 is a cross-section of the device for maintaining the pressure in the interstice between the innermost pressure vessel shell and the next pressure vessel shell at a constant multiple of the pressure within the innermost pressure vessel.

FIG. 8 is an elevational cross section of the pressure vessel of the present invention illustrating a method of detecting leaks in the pressure vessel welds.

FIG. 11 is a temperature profile of the multiple shell pressure vessel of the present invention during the second phase of filling the second interstice with molten material for a first method of filling the interstices.

FIG. 12 is a temperature profile of the multiple shell pressure vessel of the present invention during the first phase of filling the innermost interstice with molten material for a second method of filling the interstices.

FIG. 13 is a temperature profile of the multiple shell pressure vessel of the present invention during the second phase of filling the second interstice with molten material for a second method of filling the interstices.

DESCRIPTION OF THE PREFERRED EMBODIMENT

Figure 1:
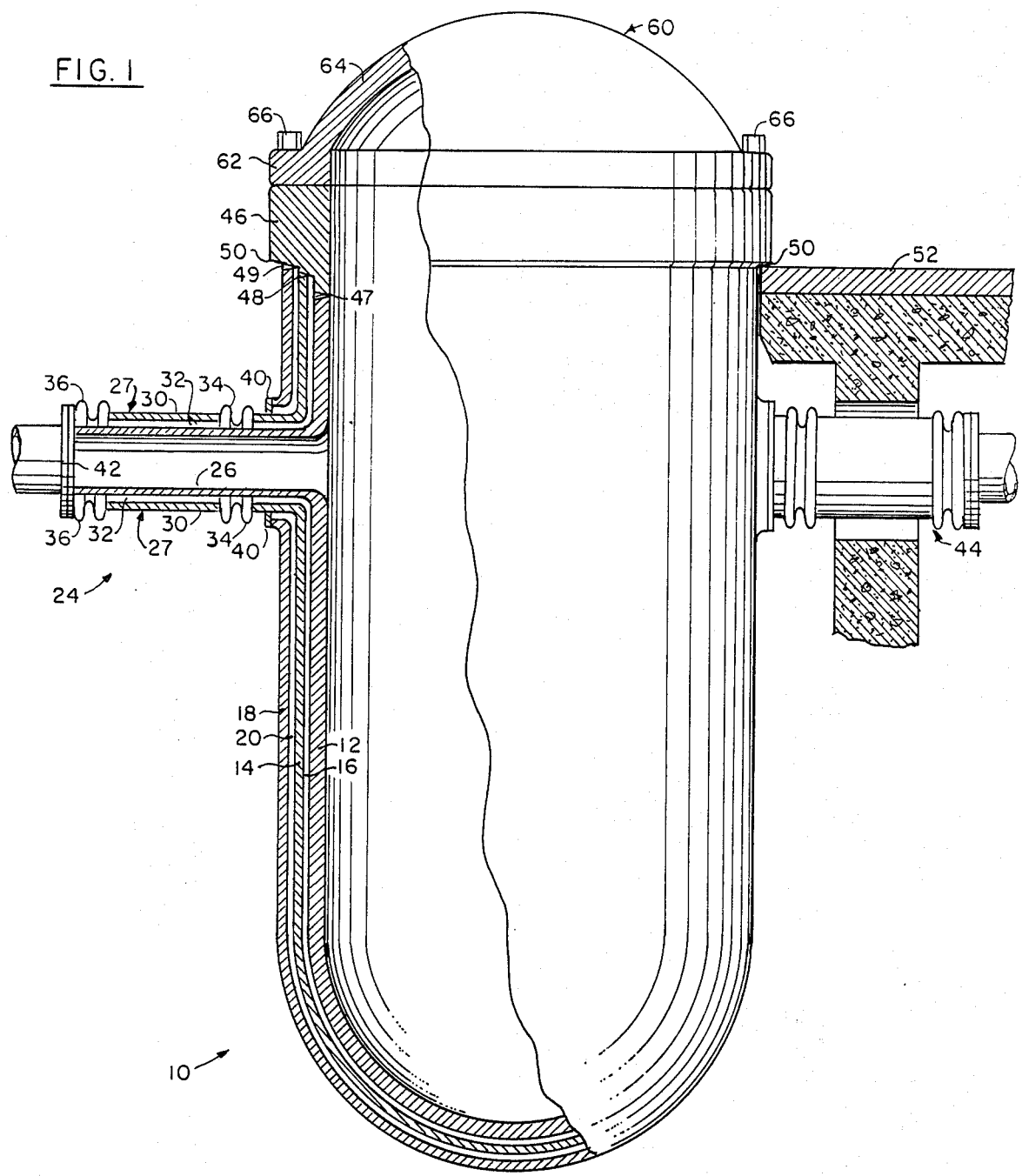
FIG. 1 is a partial sectional, elevational view of a typical multiple shell pressure vessel of the present invention.

Structure:

With reference to FIG. 1, there is illustrated a partial elevational, sectional view of a typical multiple shell pressure vessel 10 of the present invention.

Pressure vessel 10 comprises, basically, a first inner pressure vessel 12, a second inner pressure vessel 14 disposed concentric about said first inner pressure vessel and spaced apart therefrom to define first interstitial space 16, an outer pressure vessel 18 disposed concentric about said second inner pressure vessel 14 and spaced apart therefrom to define second interstitial space 20.

Pressure vessel shell 12 can be fabricated from stainless steel or stainless steel clad carbon steel. The wall thickness or structural configuration of vessel shell 12 is designed to withstand any compression forces due to the pressure from the filler material contained under pressure in interstices 16 and 20 without buckling.

Pressure vessel 10 further comprises a reactor coolant inlet port 24 comprising a generally cylindrical inner inlet conduit 26 attached, at one end, to first inner pressure vessel 12, and at its other end to flange 42, conduit 26 being in fluid communication with the interior of inner pressure vessel 12.

Reactor coolant inlet port 24 further comprises an outer inlet conduit 27 disposed concentric about inner inlet conduit 26 and spaced apart therefrom to define inlet port interstitial space 32. One end of outer inlet conduit 27 is attached to second inner pressure vessel 14, placing first interstitial space 16 in fluid communication with inlet port interstitial space 32.

Inlet port outer conduit 27 also comprises spacer conduit 30, a first bellows 34 attached at one end to vessel flange 40 and second bellows 36 attached, at one end, to outer flange 42 and, at the other end, to conduit 30 to allow for thermal expansion and contraction of inner inlet port conduit 26.

Reactor coolant outlet port 44, located proximate the opposite side of pressure vessel 10, is of identical construction as inlet port 24.

Pressure vessel 10 also comprises a top bolting flange 46, to which are attached, as by continuous, full penetration welds 47, 48 and 49 (see FIG. 2) or the like, the top rims of first inner pressure vessel 12, second inner pressure vessel 14 and outer pressure vessel 18, respectively.

Top bolting flange 46 is also provided with an extended peripheral rim or lip 50 adapted to engage pressure vessel peripheral support ledge 52. Ledge 52 is a part of the building housing the reactor pressure vessel and is designed to support and cradle pressure vessel 10.

A removable pressure vessel head 60, comprising a head bolting flange 62 attached, as by a continuous, full penetration weld or the like, to hemispherical forged head cover 64, is adapted to engage and be bolted to top flange 46 by head bolts 66.

Pressure vessel head 60 may also contain numerous small penetrations (not shown) for control rod drives, fuel rod standpipes, etc.

Interstitial spaces 16, 20 and 32 are filled with a low melting point, high boiling point material selected from the group consisting of, lead, tin, antimony, bismuth, cadmium, or sodium and potassium, and mixtures thereof. Chemical compositions or compounds containing boron or cadmium may also be added to the molten filler material. Alloys of these materials can be formulated to have various melting points. Table 1 illustrates the melting points of both the pure elements and various formulations for alloys thereof.

TABLE 1

| Alloys | Melting Point Deg. Fahr. | Composition in percent | | | | | |
|---|---|---|---|---|---|---|---|
| | | Pb | Sn | Cd | Bi | Na | K |
| Pure lead | 628 | 100 | 0 | 0 | 0 | 0 | 0 |
| Pure tin | 450 | 0 | 100 | 0 | 0 | 0 | 0 |
| Lipowitz | 140 | 26 | 13 | 10 | 51 | 0 | 0 |
| Wood's | 158 | 26 | 13 | 12 | 49 | 0 | 0 |
| Rose's | 230 | 28 | 22 | 0 | 50 | 0 | 0 |
| Sodium | 208 | 0 | 0 | 0 | 0 | 100 | 0 |
| Potassium | 144 | 0 | 0 | 0 | 0 | 0 | 100 |

It can be seen that the various percentages of alloying materials can be adjusted to achieve a particular melting point for a particular pressure vessel operating temperature.

For most applications, the melting point of the filler material should be close to or preferably somewhat higher than the operating temperatures of the pressure vessel shells so that they are "plastic" or "flowable" during operation to avoid any interlayer friction or shear forces. The filler material must also be substantially incompressible, a characteristic typical of the materials of Table 1.

In addition, the filler material must also be good thermal conductors, also a characteristic typical of the materials of Table 1 .

Also, the filler materials should have a thermal expansion that is only slightly more than the thermal expansion of the pressure vessel shells. If not, when the filler material cools down from the molten state, it will contract faster than the shells. When the molten material freezes, it will further contract.

In order to alleviate these conditions, any one or combination of the following procedures must be followed:

(a) The fillers must be pressurized at the time of filling and closing off of the interstices.

Figure 10:
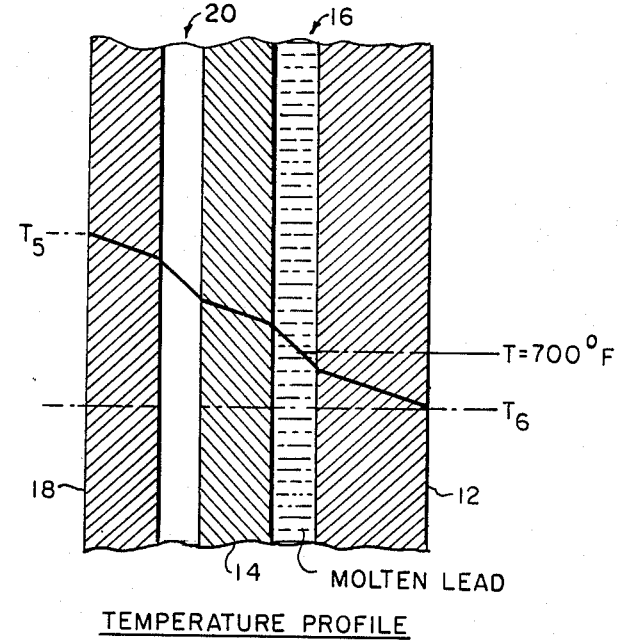
FIG. 10 is a temperature profile of the multiple shell pressure vessel of the present invention during the first phase of filling the innermost interstice with molten material for a first method of filling the interstices.

(b) The pressure vessel shells must be heated to a non-uniform temperature profile as shown in FIGS. 10 and 11. (c) A combination of pressurization of the fillers and non-uniform heating of the shells must be employed.

These procedures are necessary in order to obtain a residual positive pressure of the filler material in all the interstices upon cooling of pressure vessel 10 from the temperatures at the time of filling, to the normal or service operating condition temperatures. If these procedures are not followed, vacuum pockets, air pockets or "nests" may develop anywhere in the filler spaces. In addition, these procedures are necessary to insure that sufficient filler pressure exists to maintain the wall of inner pressure vessel 12 in compression, or at least in a state of very low tension.

Figure 2:
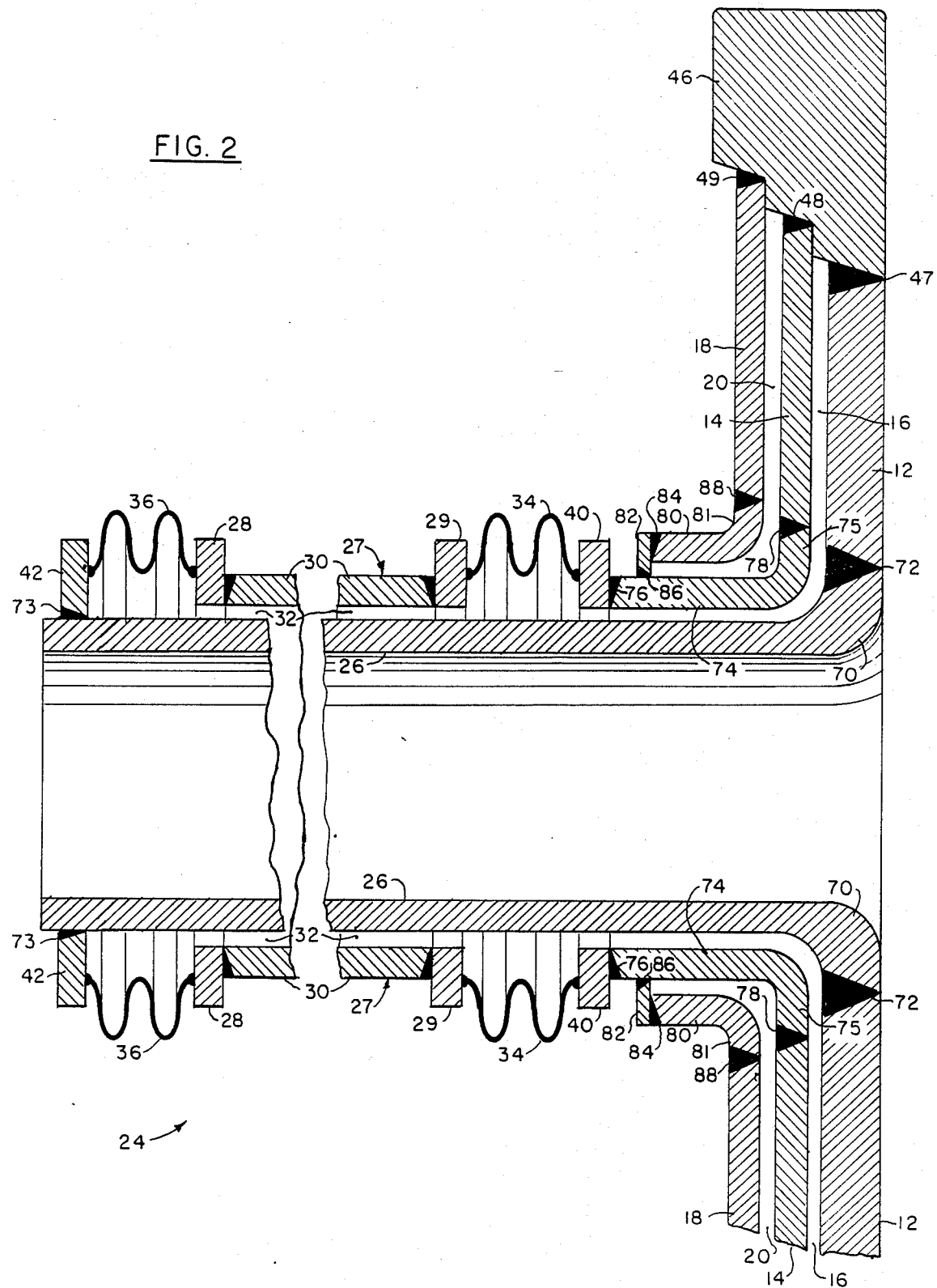
FIG. 2 is a partial sectional elevational view of the multiple shell pressure vessel of FIG. 1 showing the detail of the intersection of the inlet port with the multiple shell pressure vessel.

Since the portion of the pressure vessel most vulnerable to tensile stress cracking due to thermal and pressure transients is in the region of vessel penetrations, FIG. 2 is an illustration of a typical configuration of a coolant inlet or outlet penetration.

The inlet port or vessel penetration 24 illustrated in FIG. 2 comprises an inner conduit 26 having a flared portion 70 proximate one end that is attached, as by continuous, full penetration weld 72 or the like, to first inner pressure vessel 12. The other end of conduit 26 is attached, as by continuous, full penetration weld 73 or the like, to outer flange 42.

An outer conduit 27 comprising a first bellows 34 attached at one end to vessel flange 40 and at its other end to outer conduit flange 29, a second bellows 36 having one end attached to port outer flange 42 and at its other end to outer conduit flange 28. Flanges 28 and 29 are attached to and spaced apart by outer conduit member 30.

Outer conduit 27 is attached to pressure vessel 10 by means of cylindrical member 74, having a flared end 75. Cylindrical member 74 is first attached, as by continuous, full penetration weld 76 to flange 40. The flared end 75 of member 74 is attached, as by continuous full penetration weld 78, to second inner pressure vessel shell 14.

Interstitial space 32 between conduits 26 and 27 is thus in fluid communication with interstitial space 16 of pressure vessel 10.

In order to seal off interstitial space 20 at port 24, cylindrical member 80, having a flared end 81, is first attached, as by continuous, full penetration weld 84 or the like to sealing flange 82. Sealing flange 82 is attached, as by continuous, full penetration weld 86 or the like, to the outer surface of cylindrical member 74. The flared end 81 of cylindrical member 80 is attached, as by continuous, full penetration weld 88, or the like, to outer pressure vessel shell 18, thus sealing off interstitial space 20 around port 24.

It can be seen that when the incompressible material selected from Table 1 is pressurized to a sufficient degree to maintain the wall of inner pressure vessel 12 in compression, then the probability of crack initiation or propagation in the region around the vessel penetration is reduced or eliminated.

With reference to FIG. 3, there is illustrated the method of maintaining the spacing between concentric pressure vessel shells 12 and 14. Typically this method would also apply to the spacing between pressure vessel shells 14 and 18 although not shown in FIG. 3.

A set of radial spacers 90 are attached, as by welding or the like, to the outer side of pressure vessel shell 12 with a similarly shaped base centering spacer 92 attached, as by welding or the like, to the bottom of first inner pressure vessel shell 12 coincident with the vertical axis of rotation of the concentric vessels.

A set of radial spacers 94a and 94b are attached to the inside surface of second inner pressure vessel shell 14 and disposed on each side of radial spacers 90 to act as a guide when nesting one concentric pressure vessel within the other. A centering guide 96 is attached to the inside surface of pressure vessel shell 14 coincident with the vertical axis of rotation of the pressure vessel shells to act as a guide for member 92.

A set of radial spacers 98 and base centering spacer 99 are attached to the outside of second inner pressure vessel shell 14 in readiness for assembly of the outer pressure vessel shell.

Assembly:

The pressure vessel of the present invention is assembled in the following manner.

First, top flange 46 is place top down on a flat supporting surface.

Second, first inner pressure vessel shell 12 is placed with its open end abutting bottom inside edge of flange 46 (now facing up) and attached thereto as by continuous, full penetration weld 47 or the like. The welds are then inspected by ultrasound or other means and repaired if defective.

Third, second inner pressure vessel shell 14 is dropped over first inner pressure vessel shell 12 guided by radial members 90 and radial guides 94a and 94b. The rim of the open end of second inner pressure vessel shell 14 is attached, as by continuous, full penetration weld 48 or the like to top flange 46. The welds are then inspected by ultrasound or other means and repaired if defective.

Fourth, outer pressure vessel shell 18 is then dropped over second inner pressure vessel shell 14 guided by guide members similar to those for shells 12 and 14. The rim of the open end of outer pressure vessel 18 is attached, as by weld 49 or the like, to top flange 46. The welds are then inspected by ultrasound or other means and repaired if defective.

Fifth, port conduits 26 are then attached to inner pressure vessel shell 12, as by continuous, full penetration weld 72 or the like (FIG. 2). The welds are then inspected by ultrasound or other means and repaired if defective.

Sixth, the flared end of cylindrical member 74 is attached, as by continuous, full penetration weld 78 or the like, to second inner pressure vessel shell 14. The welds are then inspected by ultrasound or other means and repaired if defective.

Seventh, the flared end of cylindrical member 80 is attached, as by continuous, full penetration weld 88 or the like, to outer pressure vessel shell 18. The welds are then inspected by ultrasound or other means and repaired if defective.

Eighth, closure flange 82 is attached, as by continuous, full penetration weld 84 or the like, to the end of cylindrical member 80 and to the outer side of cylindrical member 74, as by continuous, full penetration weld 86 or the like. Flange 40 is welded, as by continuous, full penetration weld 76, to cylindrical member 74. The welds are then inspected by ultrasound or other means and repaired if defective.

Ninth, outer conduit 27 is pre-assembled by welding flanges 28 and 29 to outer conduit member 30, then welding one end of bellows 34 and 36 to flanges 29 and 28, respectively, and finally welding the other end of bellows 36 to flange 42 and bellows 34 to flange 40.

This outer conduit assembly 27 is then slipped over inner conduit or sleeve 26 with the other end of bellows 34 welded to flange 40. Flange 42 is then welded, as by continuous, full penetration weld 73 or the like, to inner conduit 26.

The assembled pressure vessel is now ready for filling interstices 16, 20 and 32 with the low melting point, high boiling point, substantially incompressible material selected from Table 1.

Filling Method:

The assembled pressure vessel 10 is now placed in a furnace and heated.

The heating may be accomplished by various means, such as, gas fired burners, an array of space heaters or by resistance heaters wrapped about the exterior of the vessel or the like.

The vessel assembly may be heated uniformly or non-uniformly to pre-calculated specific temperatures exceeding the melting point temperature of the low melting point material being used.

Non-uniform heating in the radial direction may be accomplished by the simultaneous heating from the outside of the pressure vessel while cooling the inside of the assembled vessel with air or other gases.

The filler material is then heated to a temperature equal to the average of the temperatures of the adjacent pressure vessel shells.

Filling can be accomplished by one of several methods.

In the first method, with reference to FIGS. 5 and 6, a peripheral header 100 containing the molten filler material selected from Table 1, is placed in fluid communication with, for example, interstice 16 through conduit 114 fluidly communicating header 100 with hole 116 in top flange 46 Hole 116 is, in turn connected in fluid communication with conduit 118 passing down through interstice 16 with its outlet 120 proximate the bottom of pressure vessel 10.

A vent hole 111 (FIG. 6) in top bolting flange 46 allows gases to escape during the filling operation. After filling is completed, vent hole 111 is sealed off by cap 122. Additional filler material is then pumped into interstice 16 until a predetermined design pressure is reached, at which time valve 124 is closed.

Interstice 20 can be filled in a similar manner using conduit 102, hole 104 and conduit 106 and valve 126.

Shell temperatures are then reduced to permit the filler materials to freeze.

Figure 9:
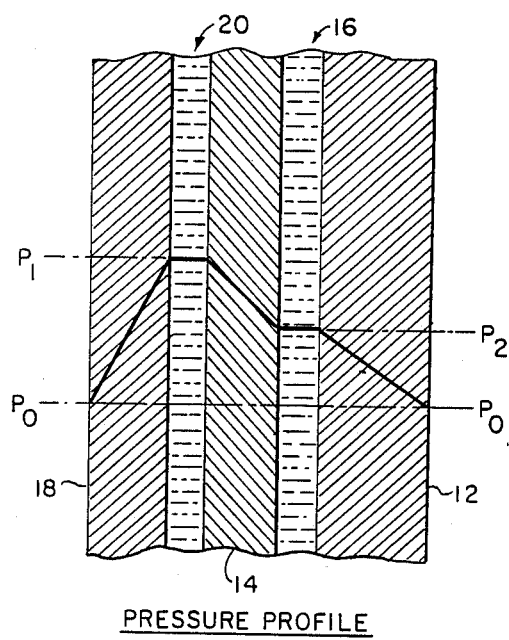
FIG. 9 is a pressure profile of the multiple shell pressure vessel of the present invention illustrating a typical pressure profile at shut-off of the pressurized molten metal during the filling operation.

With reference to FIG. 9, there is illustrated a pressure profile across the multiple shell pressure vessel 10 of the present invention at close-off of the molten material during the filling operation.

Pressure $P_2$ is established to maintain pressure vessel shell 12 in compression.

In certain instances, it is possible to fill one interstice while the temperature of the interstice material in the adjacent interstice is frozen, i.e., below the melting point of the material.

With respect to FIGS. 10 and 11, by maintaining the proper temperature gradient across the combined pressure vessel shell configuration, the temperature in the interstice being filled can be maintained above its melting point while the temperature in the adjacent interstice is below the melting point.

In FIG. 10 interstice 16 has been filled with molten lead as the filler material. The temperature gradient across pressure vessel shells 12, 14 and 18 is maintained highest ($T_5$) at outer pressure vessel shell 18 and lowest ($T_6$) at inner pressure vessel shell 12. The molten lead in interstice 16 is maintained at 700 deg. F. which is above its 628 deg. F. melting point.

With reference to FIG. 11, the temperature gradient $T_5$ to $T_6$ has shifted downward so that the temperature of the lead in interstice 16 is now 600 deg. F. and the temperature in interstice 20 is 700 deg. F. Thus, the lead in interstice 16 is below its melting point and, therefore, frozen, while the lead in interstice 20 is above its melting point.

An alternative method of filling interstices 16 and 20 is illustrated in FIGS. 12 and 13 where the temperature across the pressure vessel shells in constant.

For this second method, filler materials of different melting points are used while the pressure vessel shells are heated to a uniform temperature above the highest melting point. The first filler material having the highest melting point is placed in the first interstice, then sealed off and pressurized. The shells are cooled to the freezing point of the first filler material but above the melting point of the second filler material. the second filler material is then placed in the second interstice, rhen sealed off and pressurized. The shell can then be cooled down to allow the second filler material to freeze.

In FIG. 12, the temperature of all pressure vessel shells is maintained at 700 deg. F. while interstice 16 is filled with molten lead and then pressurized.

In FIG. 13, the temperature of all pressure vessels is lowered and maintained at a temperature of 550 deg. F. allowing the lead in interstice 16 to freeze while filling interstice 20 with molten tin, having a melting point of 450 deg. F., and then pressurized.

Constant Pressure Differential:

With reference to FIG. 7, there is illustrated a pressure regulator 150 for maintaining the pressure in interstice 16 at a constant multiple of the pressure inside first inner pressure vessel shell 12.

This device is important in maintaining this constant multiple during transient pressure events which might otherwise cause critical tensile stresses in the wall of inner pressure vessel shell 12.

Pressure regulator 150 comprises, basically, a first inner bellows 152 having one open end attached to the inner surface of first inner pressure vessel shell 12 and its other open end attached to regulator piston head 159. Pressure regulator 150 further comprises a second bellows 156, with piston 154 attached, concentrically disposed about first bellows 152 and spaced apart therefrom to define annular bellows space 158. Hole 160 in first inner pressure vessel shell 12 allows the interior of first bellows 152 to fluidly communicate with interstice 16. Hole 162 in the wall of first inner pressure vessel 12 allows annular bellows space 158 to communicate with conduit 164, which, in turn, is in fluid communication with a gas pressure control system (not shown), common in the art, outside pressure vessel 10. Annular bellows space 158 is adapted to be filled with a compressible gas.

It can be seen that, in accordance with well known laws of physics, the pressure multiple or "ratio" between the inside of first pressure vessel shell 12 and interstice 16 will be governed by the following relationship:

$$P_0 \times A_0 = P_1 \times A_1$$

where
P₀=pressure of fluid inside first inner pressure vessel shell 12.
A₀=cross-sectional area of second bellows 156.
P₁=pressure of fluid in interstice 16.
A₁=cross-sectional area of first bellows 152.
therefore:

$$M = P_1/P_0 = A_0/A_1$$

where
M=Multiple of pressure in interstice 16 relative to pressure inside first inner pressure vessel 12.

By using low strength welds for bellows 152 and 156 when attaching them to pressure vessel shell 12 or at other locations, it is possible to provide a "fail-safe" rupture mechansim. If filler material in interstice 16 overheats due to a LOCA and expands beyond a predetermined limit, the weak welds will fail and filler material containing Boron or Cadmium will be injected into the main pressure vessel to "poison" the coolant and stop or seriously reduce the nuclear chain reaction.

Leak Detection:

With reference to FIG. 8, there is illustrated a method for detecting leaks in critical welds within pressure vessel 10.

In FIG. 8, a leak detection system 200 is illustrated for the critical welds 47 and 49 used to respectively attach first inner pressure vessel shell 12 and outer pressure vessel shell 18 to top bolting flange 46.

The leak detection system comprises a first leak detection chase channel 202 attached, as by welding or the like, to the outside of first inner pressure vessel shell 12 immediately below weld 47 and also to top bolting flange 46 to provide a gas-tight conduit peripherally about vessel 12 and weld 47. Hole 204 in top bolting flange 46 is adapted to be in fluid communication with leak detector 210 through conduit 212.

The leak detection system further comprises a second leak detection chase channel 220 attached, as by welding or the like, to the inside of outer pressure vessel shell 18 immediately below weld 49 and also to top bolting flange 46 to provide a gas-tight conduit peripherally about the inside of vessel 18 and weld 49. Hole 222 in top bolting flange 46 is adapted to be in fluid communication with leak detector 230 through conduit 232.

Any leakage of radioactive material through weld 47 or a pressure rise or drop in chase channels 202 and 220 will be detected by leak detectors 210 and 230, respectively.

Figure 14:
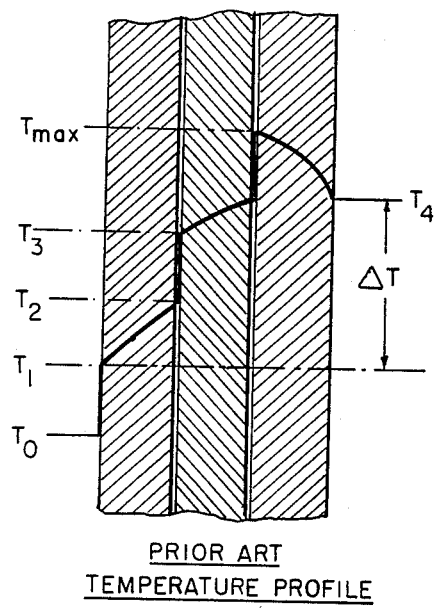
FIG. 14 is a temperature gradient profile for a typical multiple shell pressure vessel in which the shells are shrunk fit about each other.

With respect to FIG. 14, there is illustrated a temperature gradient profile across a prior art multiple shell pressure vessel wall in which the concentrically disposed pressure vessel shells are heat shrunk over each other.

It will be noted in FIG. 14 that the overall temperature drop across the vessel wall is relatively high. Such a condition tends to create substantial stresses in the vessel walls.

Figure 15:
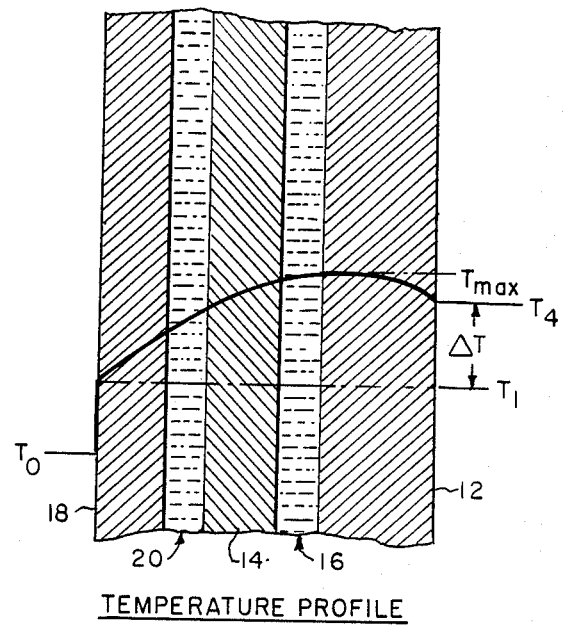
FIG. 15 is a temperature gradient profile of the pressure vessel of the present invention.

FIG. 15, is a temperature gradient profile across the multiple shell pressure vessel of the present invention in which the interstices have been filled with the thermally conductive materials previously described.

It will be noted that the overall temperature drop across the pressure vessel wall configuration of the present invention is more uniform and substantially less than that for the pressure vessel of FIG. 14.

Although the pressure vessel of the present invention has been described in specific terms, those terms are not intended to limit the scope of the present invention, such scope being limited only as stated in the claims.

I claim:

1. A method of fabricating a pressure vessel comprising the steps of
   attaching a first inner presure vessel having means defining inlet and outlet openings to a top flange,
   placing a second inner pressure vessel, having means defining inlet and outlet opening, concentric with and spaced about said first inner pressure vessel and attaching said second inner pressure vessel to said top flange,
   placing an outer pressure vessel, having inlet and outlet openings, concentric with and spaced apart about said second inner pressure vessel and attaching said outer pressure vessel to said top flange,
   attaching a generally cylindrical inner inlet conduit and a generally cylindrical inner outlet conduit respectively to said inlet and outlet openings in said first inner pressure vessel,
   attaching a generally cylindrical outer inlet conduit and a generally cylindrical outer outlet conduit respectively to said inlet and outlet opening in said second inner pressure vessel,
   heating the assembled pressure vessel to a temperature above the melting point of a material selected from the group, lead, tin, antimony, bismuth, potassium, sodium, boron and mixtures thereof,
   filling the space between said first inner pressure vessel and said second inner pressure vessel with material selected from said group,
   filling the space between said second inner pressure vessel and said outer pressure vessel with material selected from said group, and
   pressurizing said material filling said spaces between said pressure vessels to a predetermined pressure, said step comprising
   pressurizing said spaces to a pressure whereby the wall of said first inner pressure vessel is maintained in compression during steady state operation of said pressure vessel.

2. The method of fabricating the pressure vessel as claimed in claim 1 further comprising the steps of
   heating said outer pressure vessel to a temperature higher than the temperature of said first inner pressure vessel to define a temperature gradient across said first inner, second inner and outer pressure vesels, the temperature between said first inner and said second inner pressure vessels being higher than the melting point of a first filler material selected from said group,
   filling the space between said first inner and said second inner pressure vessels with said first molten material selected from said group and then pressurizing said molten material to pre-stress said first inner pressure vessel, lowering said temperature gradient between said first inner and second inner pressure vessels to below the melting point of said first filler material in said space between said first inner and said second inner pressure vessels, with the temperature gradient between said second inner and said outer pressure vessels above the melting point of said first filler material, filling the space between said second inner and said outer pressure vessels filled with said first molten material selected from said group and the pressurizing said molten material to pre-stress said second inner pressure vessel, lowering the temperature gradient between said second inner and said outer pressure vessels to below the melting point of said first filler material in said space between said second inner and said outer pressure vessels.

3. The method of fabricating the pressure vessel as claimed in claim 1 further comprising the steps of heating said first inner, second inner and outer pressure vessels to a uniform temperature above the melting point of a first filler material selected from said group of filler materials, filling the space between said first inner and said second inner pressure vessels with said first molten material selected from said group and pressurizing said molten material to pre-stress said first inner pressure vessel, lowering said temperature of said first inner, second inner and said outer pressure vessels to below the melting point of said first filler material in said space between said first inner and second inner pressure vessels, and above the melting point of a second filler material selected from said group, filling the space between said second inner pressure vessel and said outer pressure vessel with said second molten material selected from said group and pressurizing said molten material to pre-stress said second inner pressure vessel, lowering the temperature of said first inner, second inner and outer pressure vessels to below the melting point of said second material in said space between said second inner and said outer pressure vessels.

4. A pressure vessel comprising a top flange, a pressure vessel head adapted to engage said top flange, be connected thereto and maintain a seal therebetween, an inner pressure vessel attached to said top flange, an outer pressure vessel disposed concentric about said inner pressure vessel, spaced apart therefrom and attached to said top flange, a reactor coolant inlet port comprising a generally cylindrical inner inlet conduit attached to said inner pressure vessel and in fluid communication therewith, a generally cylindrical outer inlet conduit attached to said outer pressure vessel and in fluid communication with the space between said inner pressure vessel and said outer pressure vessel, a reactor coolant outlet port comprising a generally cylindrical inner outlet conduit attached to said inner pressure vessel and in fluid communication therewith, a generally cylindrical outer outlet conduit attached to said outer pressure vessel and in fluid communication with the space between said inner pressure vessel and said outer pressure vessel, a low melting point, high boiling point material selected from the group, lead, tin, antimony, bismuth, sodium, potassium, boron and mixtures thereof disposed in the space between said inner pressure vessel and said outer pressure vessel, and means for maintaining said low melting point, high boiling point material at a pressure sufficient to maintain the tensile stresses in the wall of said inner pressure vessel below the yield point of the wall material during transient pressure rises within said pressure vessel, and means for maintaining said low melting point, high boiling point material at a constant, predetermined multiple of the pressure inside the inner pressure vessel.

5. The pressure vessel as claimed in claim 4 wherein said means for maintaining said low melting point, high boiling point material at a constant, predetermined multiple of the pressure inside the inner pressure vessel comprises a first generally cylindrical bellows closed at one end and having its open end attached to said inner pressure vessel with the interior of said first bellows in fluid communication with the space between said inner pressure vessel and said outer pressure vessel, said first bellows projecting into said inner pressure vessel, a second generally cylindrical bellows closed at one end disposed concentric about said first bellows and spaced apart therefrom and having its open end attached to the inside surface of said inner pressure vessel, the closed end of said second bellows being in contact with the closed end of said first bellows, compressible fluid disposed in the space between said first bellows and said second bellows, and means for maintaining said compressible fluid at a predetermined pressure.

6. A pressure vessel comprising a top flange, a pressure vessel head adapted to engage said top flange, be connected thereto and maintain a seal therebetween, an inner pressure vessel attached to said top flange, an outer pressure vessel disposed concentric about said inner pressure vessel and spaced apart therefrom and attached to said top flange, a reactor coolant inlet port comprising a generally cylindrical inner inlet conduit attached to said inner pressure vessel and in fluid communication therewith, a generally cylindrical outer inlet conduit attached to said outer pressure vessel and in fluid communication with the space between said inner pressure vessel and said outer pressure vessel, a reactor coolant outlet port comprising a generally cylindrical inner outlet conduit attached to said inner pressure vessel and in fluid communication therewith, a generally cylindrical outer outlet conduit attached to said outer pressure vessel and in fluid communication with the space between said inner pressure vessel and said outer pressure vessel, a low melting point, high boiling point material selected from the group, lead, tin, antimony, bismuth, sodium, potassium, boron and mixtures thereof disposed in the spaced between said inner pressure vessel and said outer pressure vessel, and means for maintaining said incompressible fluid contained in the space between said inner and outer pressure vessel at a predetermined pressure whereby the material of said wall of said inner pressure vessel in maintained in compression during steady state operation of said pressure vessel.

7. The pressure vessel as claimed in claim 6 further comprising means for maintaining said low melting point, high boiling point material at a constant, predetermined multiple of the pressure inside the inner pressure vessel.

8. The pressure vessel as claimed in claim 7 wherein said means for maintaining said low melting point, high boiling point material at a constant, predetermined multiple of the pressure inside the inner pressure vessel comprises a first generally cylindrical bellows closed at one end and having its open end attached to said inner pressure vessel with the interior of said first bellows in fluid communication with the space between said inner pressure vessel and said outer pressure vessel, said first bellows projecting into said inner pressure vessel, a second generally cylindrical bellows closed at one end disposed concentric about said first bellows and spaced apart therefrom and having its open end attached to the inside surface of said inner pressure vessel, the closed end of said second bellows being in contact with the closed end of said first bellows, compressible fluid disposed in the space between said first bellows and said second bellows, and means for maintaining said compressible fluid at a predetermined pressure.

9. A pressure vessel comprising a top flange, a pressure vessel head adapted to engage said top flange, be connected thereto and maintain a seal therebetween, a first inner pressure vessel attached to said top flange, a second inner pressure vessel disposed concentric about said first inner pressure vessel and spaced apart therefrom and attached to said top flange, an outer pressure vessel disposed concentric about said second inner pressure vessel and spaced apart therefrom and attached to said top flange, a reactor coolant inlet port comprising a generally cylindrical inner inlet conduit attached to said first inner pressure vessel and in fluid communication therewith, a generally cylindrical outer inlet conduit attached to said second inner pressure vessel and in fluid communication with the space between said first inner pressure vessel and said second inner pressure vessel, a reactor coolant outlet port comprising a generally cylindrical inner outlet conduit attached to said first inner pressure vessel and in fluid communication therewith, a generally cylindrical outer outlet conduit attached to said second inner pressure vessel and in fluid communication with the space between said first inner pressure vessel and said second inner pressure vessel, a low melting point, high boiling point material selected from the gorup, lead, tin, antimony, bismuth, sodium, potassium, boron and mixtures thereof disposed in the space between said first inner pressure vessel and said second inner pressure vessel, and between said second inner pressure vessel and said outer pressure vessel, and means for maintaining said low melting point, high boiling point material at a pressure sufficient to maintain the tensile stresses in the wall of said inner pressure vessel below the yield point of the material of said wall during transient pressure rises within said pressure vessel, and means for maintaining said low melting point, high boiling point material at a constant, predetermined multiple of the pressure inside the inner pressure vessel.

10. The pressure vessel as claimed in claim 9 wherein said means for maintaining said low melting point, high boiling point material at a constant, predetermined multiple of the pressure inside the inner pressure vessel comprises a first generally cylindrical bellows closed at one end and having its open end attached to said inner pressure vessel with the interior of said first bellows in fluid communication with the space between said inner pressure vessel and said outer pressure vessel, said first bellows projecting into said inner pressure vessel, a second generally cylindrical bellows closed at one end disposed concentric about said first bellows and spaced apart therefrom and having its open end attached to the inside surface of said inner pressure vessel, the closed end of said second bellows being in contact with the closed end of said first bellows, compressible fluid disposed in the space between said first bellows and said second bellows, and means for maintaining said compressible fluid at a predetermined pressure.

11. A pressure vessel comprising a top flange, a pressure vessel head adapted to engage said top flange, be connected thereto and maintain a seal therebetween, a first inner pressure vessel attached to said top flange, a second inner pressure vessel disposed concentric about said first inner pressure vessel and spaced apart therefrom and attached to said top flange, an outer pressure vessel disposed concentric about said second inner pressure vessel and spaced apart therefrom and attached to said top flange, a reactor coolant inlet port comprising a generally cylindrical inner inlet conduit attached to said first inner pressure vessel and in fluid communication therewith, a generally cylindrical outer inlet conduit attached to said second inner pressure vessel and in fluid communication with the space between said first inner pressure vessel and said second inner pressure vessel, a reactor coolant outlet port comprising a generally cylindrical inner outlet conduit attached to said first inner pressure vessel and in fluid communication therewith, a generally cylindrical outer outlet conduit attached to said second inner pressure vessel and in fluid communication with the space between said first inner pressure vessel and said second inner pressure vessel, a low melting point, high boiling point material selected from the group, lead, tin, antimony, bismuth, sodium, potassium, boron and mixtures thereof disposed in the spaced between said first inner pressure vessel and said second inner pressure vessel, and between said second inner pressure vessel and said outer pressure vessel, and means for maintaining said incompressible fluid contained in the space between said inner and second inner pressure vessel at a predetermined pressure whereby the material of said wall of said inner pressure vessel in maintained in compression during steady state operation of said pressure vessel.

12. The pressure vessel as claimed in claim 11 further comprising means for maintaining said low melting point, high boiling point material at a constant, predetermined multiple of the pressure inside the inner pressure vessel.

13. The pressure vessel as claimed in claim 11 wherein said means for maintaining said low melting point, high boiling point material at a constant, predetermined multiple of the pressure inside the inner pressure vessel comprises a first generally cylindrical bellows closed at one end and having its open end attached to said inner pressure vessel with the interior of said first bellows in fluid communication with the space between said inner pressure vessel and said outer pressure vessel, said first bellows projecting into said inner pressure vessel, a second generally cylindrical bellows closed at one end disposed concentric about said first bellows and spaced apart therefrom and having its open end attached to the inside surface of said inner pressure vessel, the closed end of said second bellows being in contact with the closed end of said first bellows, compressible fluid disposed in the space between said first bellows and said second bellows, and means for maintaining said compressible fluid at a predetermined pressure.

14. The pressure vessel as claimed in claim 11 further comprising means for detecting leakage of fluid from within said first inner pressure vessel disposed in the spaces between said first inner pressure vessel and said outer pressure vessel.

15. The pressure vessel as claimed in claim 14 wherein said means for detecting leakage of fluid comprises a leak detection channel disposed about the inner periphery of said outer pressure vessel proximate the welded connections thereof to other parts thereof, and a conduit in fluid communication with said leak detection channel and the exterior of said pressure vessel.

16. The pressure vessel as claimed in claim 14 wherein said means for detecting leakage of fluid comprises a leak detection channel disposed about the outer periphery of said first inner pressure vessel proximate the weled connections thereof to other parts thereof, and a conduit in fluid communication with said leak detection channel and the exterior of said pressure vessel.

* * * * *